United States Patent [19]

Matsushima

[11] Patent Number: 5,745,810
[45] Date of Patent: Apr. 28, 1998

[54] IMAGE TAKING APPARATUS

[75] Inventor: Hiroshi Matsushima, Machida, Japan

[73] Assignee: Canon Kabushiki Kaisha, Tokyo, Japan

[21] Appl. No.: 823,876

[22] Filed: Mar. 17, 1997

Related U.S. Application Data

[63] Continuation of Ser. No. 327,401, Oct. 21, 1994, abandoned.

[30] Foreign Application Priority Data

Oct. 29, 1993 [JP] Japan .................................. 5-292479

[51] Int. Cl.$^6$ ............................. G03B 7/28; G03B 17/20
[52] U.S. Cl. .................. 396/289; 396/296; 396/234; 396/51
[58] Field of Search ........................ 396/296, 121, 396/233–234, 100, 51, 282, 289

[56] References Cited

U.S. PATENT DOCUMENTS

| | | | |
|---|---|---|---|
| 4,309,091 | 1/1982 | Fukuhara et al. | 354/31 |
| 5,253,008 | 10/1993 | Konishi et al. | 354/402 |
| 5,392,091 | 2/1995 | Iwasaki | 354/432 |
| 5,461,453 | 10/1995 | Watanabe et al. | 354/471 |

*Primary Examiner*—Safet Metjahic
*Assistant Examiner*—Michael Dalakis
*Attorney, Agent, or Firm*—Fitzpatrick, Cella, Harper & Scinto

[57] ABSTRACT

An image taking apparatus including a photometry device that detects a luminance value for each of a plurality of areas of a photometric field, a selection circuit that selects one of the plurality of areas to be a reference area, a computing circuit that computes a difference value for each of the plurality of areas, each difference value representing a difference between the luminance value for a respective area and the luminance value for the reference area, and a display device that respectively displays the difference values for each of the plurality of areas.

11 Claims, 7 Drawing Sheets

IMAGE TAKING APPARATUS

This application is a continuation of application No. 08/327,401 filed Oct. 21, 1994, now abandoned.

BACKGROUND OF THE INVENTION

1. Field of the Invention

The present invention relates to an image taking apparatus, such as a camera and, in particular, to an image taking apparatus having a detector for detecting a luminance distribution of an object whose image is to be taken.

2. Description of the Related Art

In conventional cameras in which divisional photometry is possible, proper exposure is determined in the camera on the basis of photometric values for a plurality of areas of an object to be photographed.

However, to obtain information regarding a luminance distribution of the object, the photographer must select spot photometry, divisional photometry or the like and change an orientation of the camera so as to perform photometry on each of the different areas of the object.

SUMMARY OF THE INVENTION

It is an object of the present invention to provide an image taking apparatus which can easily check the luminance distribution of an object whose image is to be taken. This object is achieved by the various aspects of the present invention discussed below.

In a first aspect of the present invention, an image taking apparatus comprises image detecting means for detecting an image of an object, photometry means for detecting a luminance distribution of the object, and display means for displaying the detected luminance distribution.

In a second aspect of the present invention, an image taking apparatus comprises image detecting means for detecting an image of an object, photometry means for detecting the luminance distribution of the object, display means for displaying the detected luminance distribution, and control means for controlling the image detecting means in accordance with an output from the photometry means.

In a third aspect of the present invention, an image taking apparatus comprises image detecting means for detecting an image of an object, photometry means for detecting the luminances of a plurality of areas of the object, display means for displaying information on the luminances of the plurality of areas of the object, and control means for controlling the image detecting means in accordance with an output from the photometry means.

In a preferred form according to the third aspect of the present invention, there is provided a selection means for selecting at least one of the plurality of areas of the object, and the control means controls the image detecting means in accordance with the output of the photometry means and an output from the selection means.

In a more preferred form according to the third aspect of the present invention, the display means changes the display in accordance with the output of the selection means.

In a fourth aspect of the present invention, an image taking apparatus comprises image detecting means for detecting an image of an object, a finder for viewing the object, photometry means for detecting luminances of a plurality of areas of the object corresponding to a plurality of sections of a field of view of the finder, display means for displaying information regarding the luminances of the areas of the object in the corresponding sections of the field of view of the finder, detecting means for detecting the section of the field of view of the finder which corresponds to a visual axis, and control means for controlling the image detecting means in accordance with an output from the photometry means and an output from the detecting means.

DESCRIPTION OF THE PREFERRED EMBODIMENTS

Figure 1:
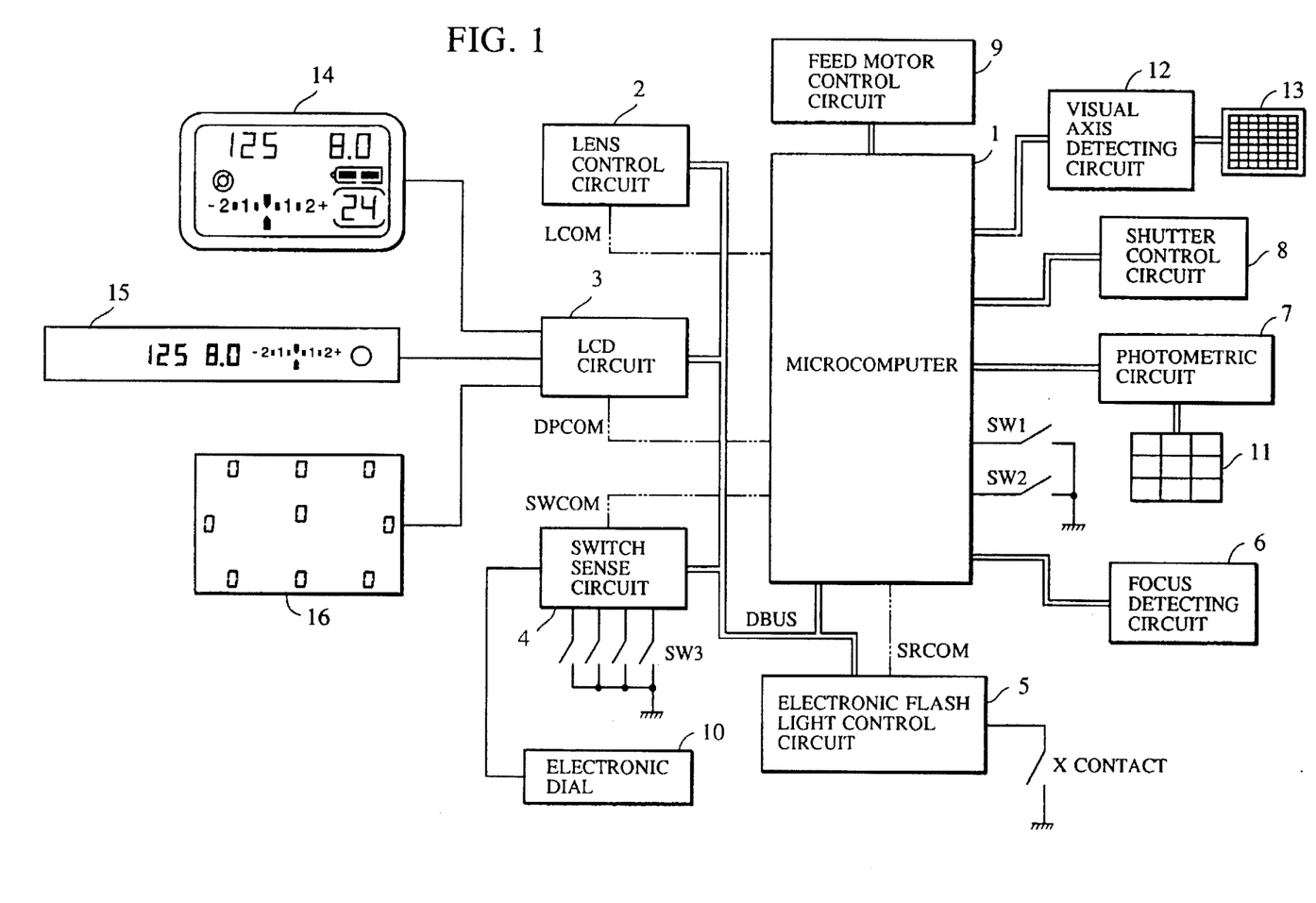
FIG. 1 is a block diagram showing essential components of a camera according to a first embodiment of the present invention.

FIG. 1 is a block diagram showing the essential components of a camera according to a first embodiment of the present invention.

In the drawing, numeral 1 indicates a microcomputer, which controls the operations of various circuits in the manner described below.

Numeral 2 indicates a lens control circuit for driving and controlling a motor for fucusing a photographic lens (not shown), a zooming motor, and a motor for controlling aperture blades. When receiving an LCOM signal from the microcomputer 1, the lens control circuit 2 performs serial communication through a DBUS (data bus). Specifically, the lens control circuit 2 receives motor drive information through the DBUS by serial communication, then drives and controls the motors on the basis of this information. At the same time, the lens control circuit 2 transmits various items of lens information (focal length, etc.) to the microcomputer 1 through the DBUS by serial communication.

Numeral 3 indicates an LCD circuit which drives liquid crystal displays 14, 15 and 16 for informing the photographer, for example, of the shutter speed (Tv), the aperture value (Av), the ISO sensitivity, and the number of exposures available (remaining number of frames). When receiving a DPCOM signal from the microcomputer 1, the LCD circuit 3 performs serial communication through the DBUS. Specifically, it receives display data through the DBUS by serial communication, and drives the liquid crystal displays 14 through 16 on the basis of the display data.

Numeral 4 indicates a switch sense circuit which reads the state of switches indicating the camera conditions, for example, switches for enabling the photographer to set various photographic conditions and a switch SW3 for selecting a photometric area as a reference area. The switch sense circuit 4 transmits the state of the switches thus read to the microcomputer 1. When receiving an SWCOM signal, the switch sense circuit 4 transmits switch data to the microcomputer 1 by serial communication through the DBUS. Numeral 5 indicates an electronic flash light control circuit for effecting and stopping electronic-flash-light emission by TTL light modulation. While receiving an SRCOM signal, the electronic flash light control circuit 5 performs serial communication with the microcomputer 1 through the DBUS, receives data regarding electronic-flash-light control and performs various control operations.

Numeral 6 indicates a focus detecting circuit including a line sensor for effecting AF (auto focusing) using a phase difference detecting method and a circuit unit for reading out accumulated charges of the line sensor. The focus detecting circuit 6 is controlled by the microcomputer 1. Numeral 7 indicates a photometric circuit which performs photometry with respect to the object to be photographed using a divisional photometry sensor 11 and supplies the microcomputer 1 with a plurality of photometry outputs corresponding to the luminance distribution of the object. The microcomputer 1 performs A/D conversion of the plurality of photometric outputs to utilize them for setting the exposure conditions, such as aperture value and shutter speed.

Numeral 8 indicates a shutter control circuit for performing movement control of the front and rear curtains (not shown) of the shutter in accordance with a control signal from the microcomputer 1. Numeral 9 indicates a feeding circuit for feeding (advancing and rewinding) a film in accordance with a control signal from the microcomputer 1.

Symbol SW1 indicates a switch which turns ON in response to a first half-stroke of a release button (not shown) for starting the operation of the camera. Upon detecting the turning ON of the switch SW1, the microcomputer 1 causes the camera to start photometry, ranging and information display. Symbol SW2 indicates a switch which turns ON in response to a second half-stroke of the above-mentioned release button. Upon detecting the turning ON of the switch SW2, the microcomputer 1 causes the camera to start exposure. Symbol SW3 indicates a reference photometric area changing switch. While the switch SW3 is ON, visual axis information is input to the microcomputer 1, and the photometric area is changed in accordance with the input visual axis information.

An X contact turns ON when movement of the front curtain of the shutter has been completed, and informs the electronic flash light control circuit 5 of the electronic-flash-light emission timing.

Numeral 10 indicates an electronic dial for changing the Tv value, Av value, various photographic modes, etc. For example, when the electronic dial 10 is turned while the mode changing push-button switch (not shown) is being depressed, the mode is changed as follows: "Tv first"→"Av first"→"manual"→"program"→"Tv first"→"Av first"→"manual"→"program" . . . . thereby enabling the photographer to place the camera in a desired mode. When the electronic dial 10 is turned in the reverse direction, the mode is changed as follows: "program"→"manual"→"Av first"→"Tv first"→"program" . . . . When the camera has been placed in the "Tv first" mode by using the mode changing push-button switch and the electronic dial 10, it is possible for the photographer to set a desired Tv value by turning the electronic dial 10 again. When the camera has been placed in the "Av first" mode by using the mode changing push-button switch and the electronic dial 10, it is possible for the photographer to set a desired Av value by turning the electronic dial 10 again.

Numeral 11 indicates a divisional photometry sensor which is driven by the photometric circuit 7 and is equipped with nine light-receptive sections. Numeral 12 indicates a visual axis detecting circuit which drives a CCD 13 for taking an image of the eye of the photographer and an IRED (not shown) for illuminating the eye of the photographer. The visual axis detecting circuit 12 transfers outputs of the CCD 13 to the microcomputer 1, which performs A/D conversion of the outputs of the CCD 13 and detects a section of the finder being gazed at by the photographer based on a well-known visual axis (eye direction) detection method.

Numeral 14 indicates an external liquid crystal display positioned on the upper surface of the camera body; numeral 15 indicates a liquid crystal display provided within the finder; and numeral 16 indicates a superimposition liquid crystal display superimposed on a focusing screen of the finder and adapted to give a superimposed display on the focusing screen. As stated above, these components are driven by the LCD circuit 3.

Next, this embodiment will be described with reference to FIGS. 2 and 3.

First, FIG. 2 will be explained. The drawing shows an interior of the finder. In this embodiment, a picture plane (view filed) is divided into nine areas 1 through 9 for photometry. In other words, the object is divided into nine areas, and the luminance of each of these areas is measured. The differences between the photometric values of these areas are indicated by numeral display sections 100 through 108 in the finder by using the superimposition liquid crystal display 16 in FIG. 1. These nine areas of the picture plane respectively correspond to the nine light-receptive sections of the sensor 11.

In the early stage of the ON state of the switch SW1, the differences between the photometric value of the central photometric area 5 and the photometric values of the other areas are respectively displayed on the numeral display sections 100 through 103 and 105 through 108 respectively provided in the areas 1 through 4 and 6 through 9.

Figure 2:
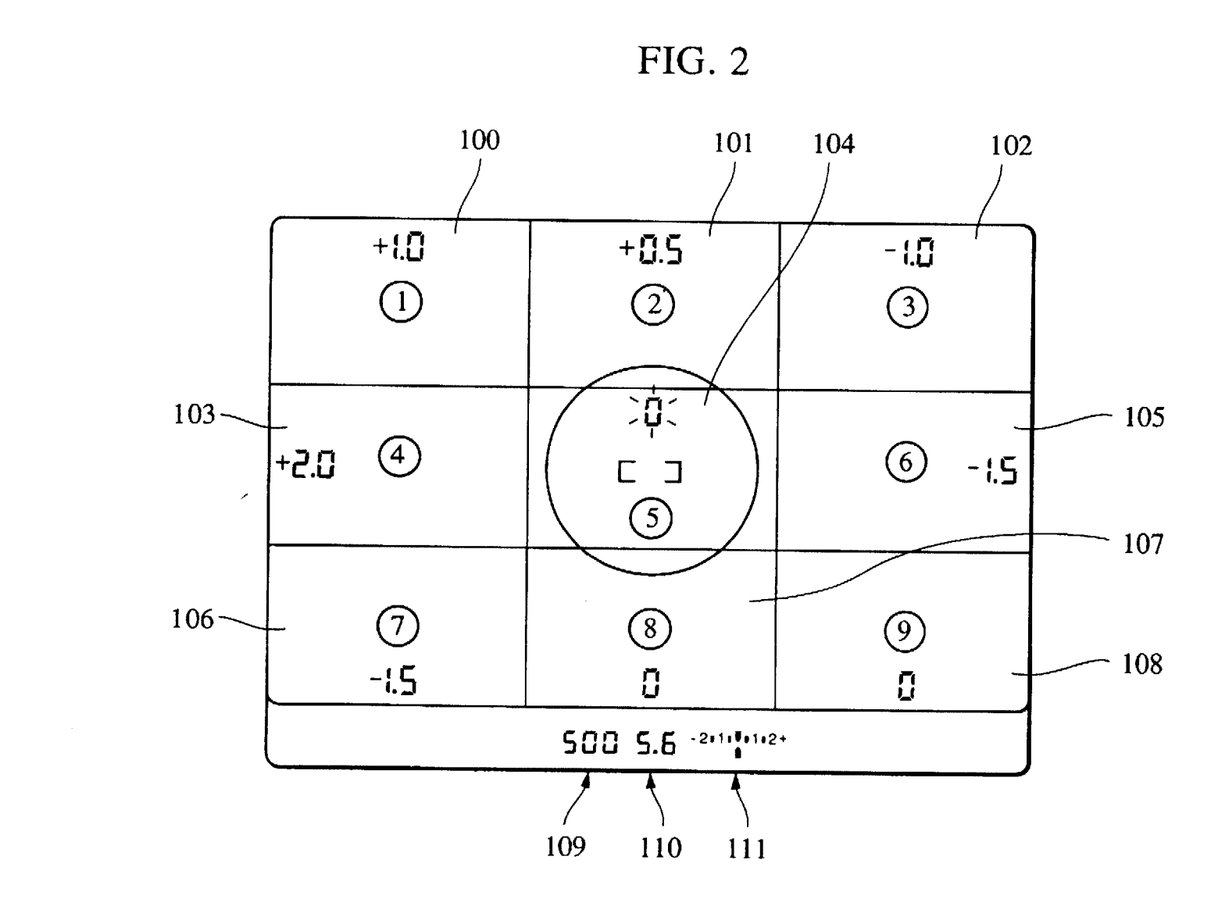
FIG. 2 is a diagram showing a display in the finder indicating the photometric values, etc. of the photometric areas in the first embodiment of the present invention.

For example, as shown in FIG. 2, the photometric area 1 is one grade brighter than the photometric area 5, so a display of "+1.0" is given in the numeral display section 100. Similarly, the photometric area 2 is 0.5 grades brighter than the photometric area 5, so a display of "+0.5" is given in the numeral display section 101. The photometric area 3 is one grade darker than photometric area 5, so a display of "−1.0" is given in the numeral display section 102. The photometric area 4 is 2 grades brighter than photometric area 5, so a display of "+2" is given in the numeral display section 103. The photometric area 6 is 1.5 grades darker than photometric area 5, so a display of "−1.5" is given in the numeral display section 105. The photometric area 7 is also 1.5 grades darker than the photometric area 5, so a display of "−1.5" is given in the numeral display section 106. The photometric area 8 is of the same brightness as photometric area 5, so a display of "0" is given in the numeral display section 107. The photometric area 9 is also of the same brightness as photometric area 5, so a display of "0" is given in the numeral display section 108.

Since the central photometric area 5 serves as a reference for the luminance values of these areas 1–9, a display of "0" is given in the numeral display section 104. Further, to indicate that it is the reference area for the current luminance values, the numeral display for the central photometric area 5 blinks on and off. In the condition shown in the drawing, the apparatus is in the initial state, so the numeral display section 104 of the central photometric area 5 automatically blinks on and off. In the states other than the initial one, a photometric area selected by visual axis input (i.e., the area gazed at by the photographer) serves as the reference area, and the numeral display section corresponding to that area blinks to indicate that it is the reference area.

Numeral display sections 109 and 110 and a corrected-exposure numeral display section 111 are provided in the liquid crystal display 15 within the finder, shown in FIG. 2. The numeral display section 109 displays a shutter speed (which is, in this example, "Tv=1/500"), and the numeral display section 110 displays an aperture value (which is, in this example, "Av=5.6"). The displayed values are obtained through computation on the basis of the photometric value of the selected photometric area. The corrected-exposure numeral display section 111 displays a definite value of exposure correction. In the example of FIG. 2, no exposure correction has been input, so a dot is displayed at the position of "0".

Next, FIG. 3 will be explained.

Figure 3:
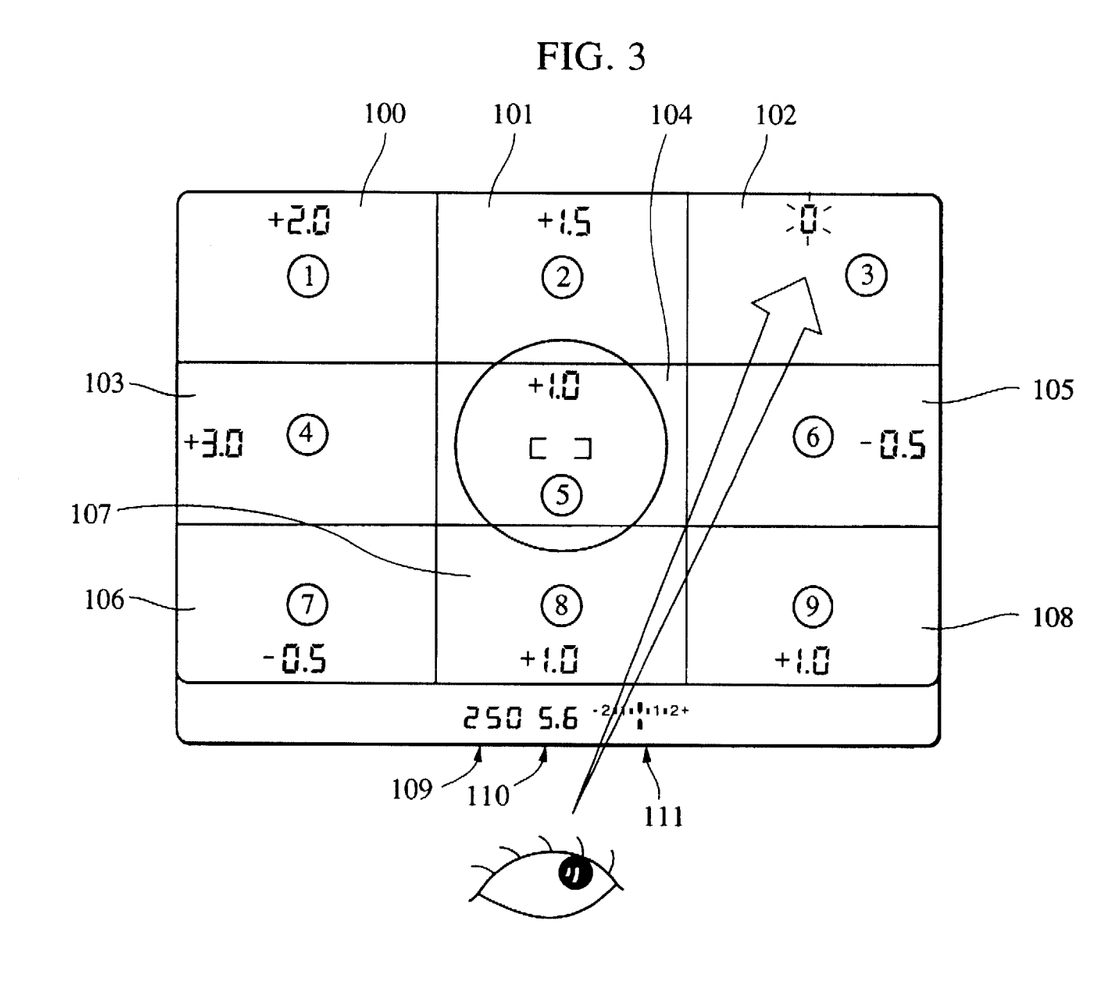
FIG. 3 is a diagram showing a display in the finder when a reference photometric area is selected by visual axis input.

In FIG. 3, the reference photometric area has been changed from the central photometric area 5, which was the reference in the condition of FIG. 2, to the photometric area 3. To effect this change, the photographer gazes at the selected photometric area 3 to be selected, and depresses the reference photometric area changing switch SW3 (i.e., turns on the switch).

In the case of FIG. 3, the reference photometric area has been changed to photometric area 3 by visual axis input. Accordingly, the luminance difference display in photometric area 3, which was "−1.0" and did not blink in the condition of FIG. 2, has been changed to a blinking display of "0". At the same time, the display in photometric area 5, which was "0" and blinking in the condition of FIG. 2, has been changed to a display of "+1.0" which does not blink. Since the difference in luminance between the photometric areas 3 and 5 in the condition of FIG. 2 was "−1.0", the difference in luminance between the photometric areas 3 and 5 in the condition of FIG. 3 is also "−1.0". The numeral display sections of the remaining photometric areas also give a luminance difference display using the photometric area 3 as the reference.

Regarding the display of the Tv and Av values, they are computed on the basis of photometric area 3, so that they are changed from "Tv=1/500, Av =5.6" to "Tv=1/250, Av=5.6". It is assumed here that the photographic mode of the camera is "Av first". Further, no exposure correction has been effected at this stage, either, so that a dot is displayed at the position of "0" of the corrected-exposure numeral display section 111.

Next, a case will be explained with reference to FIG. 4 in which exposure correction is effected. In this case, exposure correction by −2 grades is effected on the camera in the state of FIG. 3 (in which area 3 is the reference photometric area) by turning the electronic dial 10.

Figure 4:
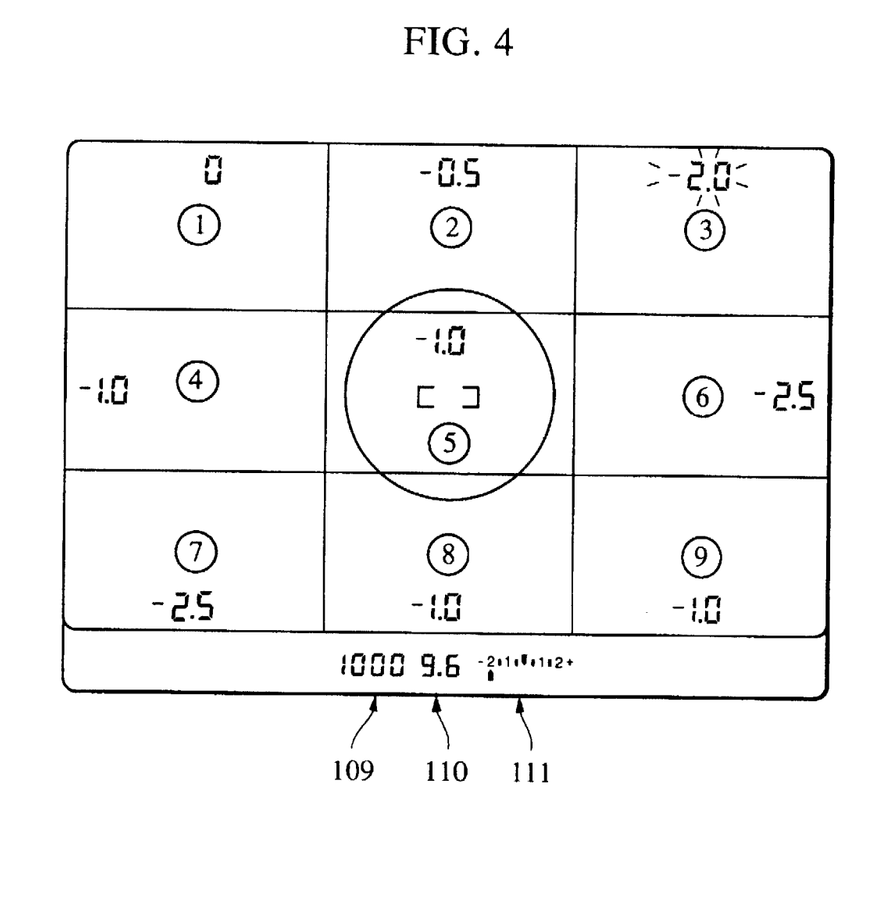
FIG. 4 is a diagram showing a display in the finder when exposure correction is effected in the state of FIG. 3.

Since exposure correction by −2 grades is effected on area 3, which, in this state, is the reference photometric area, the dot display, which was "0" in FIG. 3, becomes "−2.0" in the condition of FIG. 4. Further, the Tv and Av values, which were displayed as: "Tv=1/250, Av=5.6", are now displayed as: "Tv=1/1000, Av=5.6", and the display in the numeral display section 102 of photometric area 3 is changed to a value obtained by correcting the value of this display section in the state of FIG. 3 by −2degrees. The luminance difference displays of the numeral display sections 100, 101 and 103 through 108 of the photometric areas 1, 2 and 4 through 9 are also values obtained by effecting correction by −2degrees of the values of FIG. 3.

Figure 5:
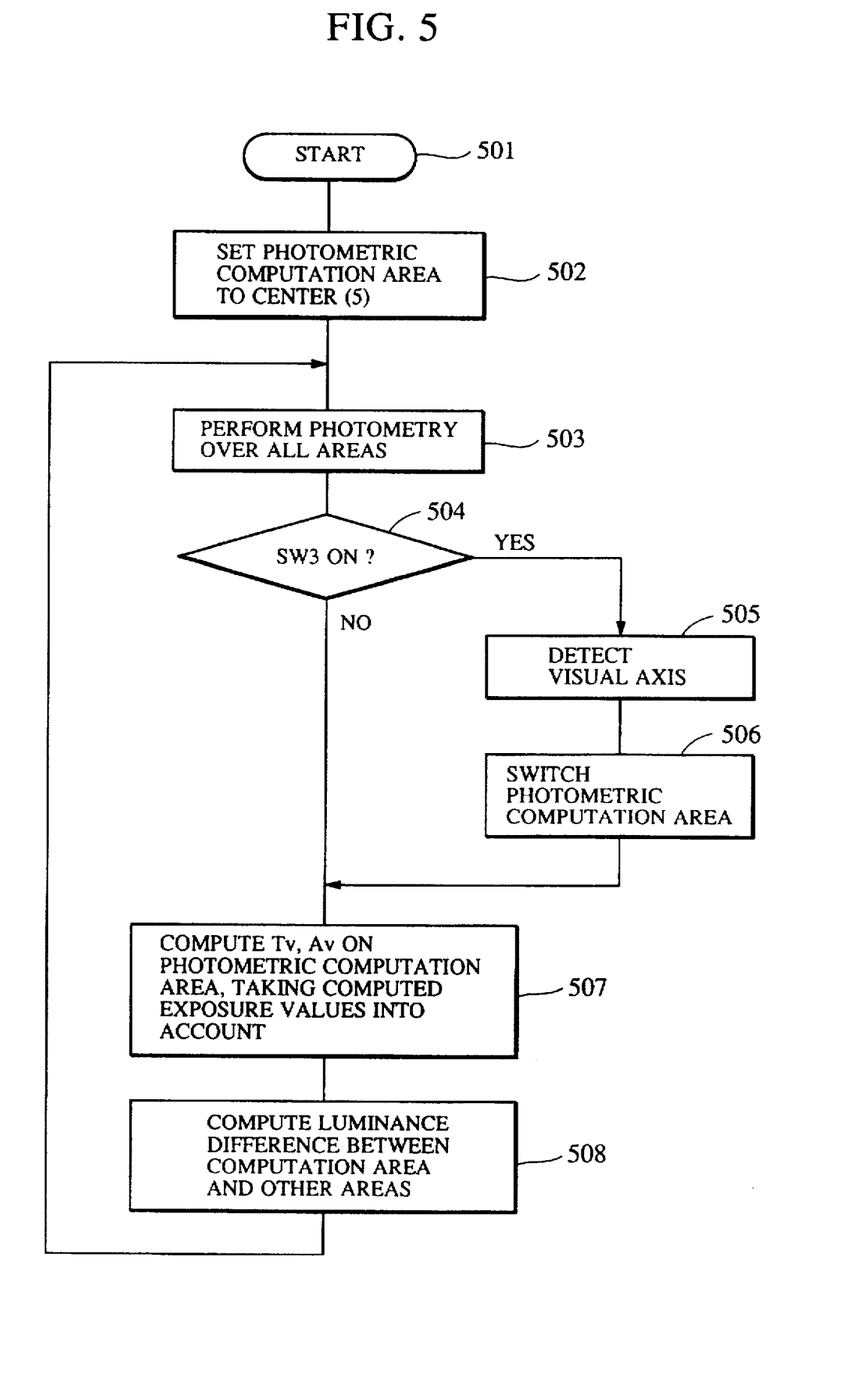
FIG. 5 is a flowchart showing the operation of the camera of the first embodiment.

Next, the above operations will be described with reference to the flowchart of FIG. 5.

[Step 502] The photometric area to be used in the calculation of the Tv and Av values in divisional photometry is set to the central photometric area 5.

[Step 503] Photometric information is obtained with respect to each of the nine photometric areas in the divisional photometry sensor 11.

[Step 504] A judgment is made as to whether the reference photometric area changing switch SW3 is ON or not. When it is determined that the switch is ON, the procedure advances to step 505 for visual axis detection. When it is determined that the switch is OFF, the procedure advances to step 507.

[Step 505] The photometric area being gazed at by the photographer is detected. That is, a visual axis detecting operation is performed to detect the photometric area in the finder which has been selected as the next reference photometric area (i.e., the next reference point for photometric calculation).

[Step 506] The reference photometric area is changed on the basis of the visual axis detection data obtained in Step 505. As described above, the display of the former reference photometric area, which was blinking before the change, is converted to a display that is constantly lit. The new reference photometric area is switched to a blinking display.

[Step 507] When exposure correction has been effected on the photometric values of the reference photometric area, the Tv and Av values are calculated taking the exposure values into account. The values thus obtained are displayed through the display sections 109, 110 and 111 of the liquid crystal display 11.

[Step 508] The differences in luminance between the reference photometric area and the other photometric areas are calculated, and the resulting values are respectively displayed through the numeral display sections of the photometric areas. When exposure correction has been effected, the corrected exposure values are taken into account in displaying the luminance difference values.

A camera according to a second embodiment of the present invention will be described with reference to FIGS. 6 and 7. A description of a circuit configuration of this camera will be omitted since it is the same as that shown in FIG. 1.

In the second embodiment, a plurality of photometric areas are selected by visual axis input, and the values of Av and Tv are calculated by using the average of the photometric values obtained with respect to these photometric areas.

Figure 6:
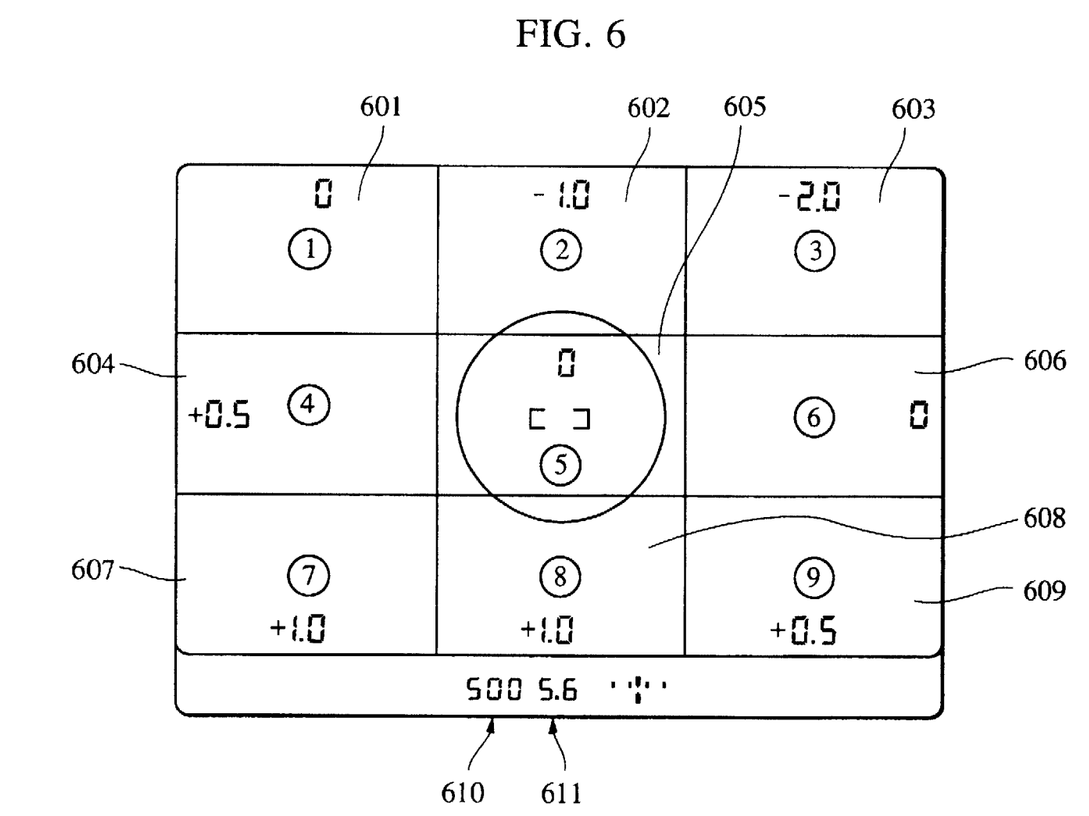
FIG. 6 is a diagram showing a display in the finder indicating the photometric values, etc. of photometric areas in a second embodiment of the present invention.

FIG. 6 shows a display within the finder, in which a picture plane (view field) is divided into nine areas 601 through 609 for photometry.

When none of the photometric areas has been selected by the visual axis of the photographer, the Tv and Av values are calculated with respect to the photometric value of the central photometric area 605, and are displayed on numeral display sections 610 and 611, respectively. As to the photometric areas other than the central photometric area 605, the differences between the luminance of the photometric area 605 and their respective luminances are displayed on their respective numeral display sections.

Figure 7:
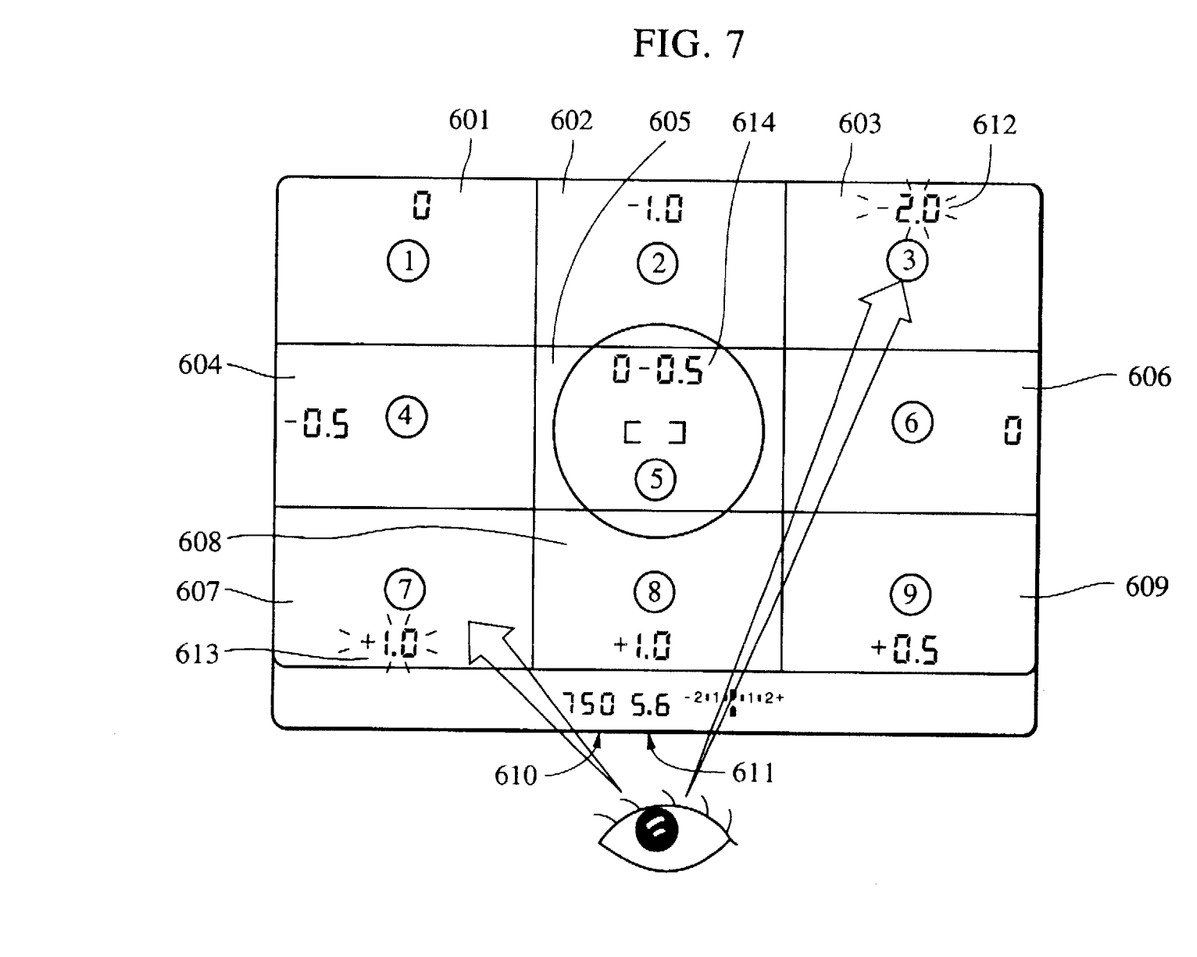
FIG. 7 is a diagram showing a display in the finder when arbitrary photometric areas are selected by visual axis input.

Next, suppose, as shown in FIG. 7, the photographer has selected the upper right and lower left photometric areas 603 and 607 by visual axis input.

In this case, the microcomputer 1 calculates the Tv and Av values on the basis of an average of the photometric values of the photometric areas 603 and 607, and the numeral display sections 610 and 611 display the Tv and Av values, respectively. Further, the display of the numeral display sections in the photometric areas thus selected by visual axis input, is switched from a steadily lit display to a blinking display in order to indicate to the photographer that these areas have actually been selected (as indicated at 612 and 613 in FIG. 7).

Further, the difference between the average of the photometric values of the plurality of photometric areas, selected by visual axis input, and the photometric value of the central photometric area 605 is displayed through a numeral display section 614, as shown in FIG. 7, indicating to the photographer that the Tv and Av values are being calculated on the basis of the average of the photometric values of the plurality of photometric areas selected by visual axis input.

According to the second embodiment, a plurality of photometric areas in conformity with the intention of the photographer are selected from divisional photometric areas, and the Tv and Av values are calculated on the basis of the average of the values of the selected plural photometric areas, thereby making it possible for the photographer to easily decide on an exposure more matched with his intentions on the basis of the information in the finder. Further, in this embodiment, it is possible to perform averaged photometry of all the divisional photometric areas.

In accordance with the embodiments described above, a luminance distribution of an object, which has conventionally been checked by the photographer by changing a camera orientation so as to move from one photometric point to the other, can be checked without having to change the camera orientation. Further, by using the visual axis of the photographer, a point whose luminance value is to serve as the reference for exposure can be designated more quickly and easily.

Although in the first embodiment the picture plane is divided into nine photometric areas, the number of divisional photometric areas is not restricted to nine. Thus, while in the above embodiment the photometric value of the central photometric area is selected when none of the photometric areas has been selected by visual axis input, there may be cases where no such central photometric area exists. In such a case, exposure control values (e.g., the Tv and Av values) can be calculated on the basis of photometric values of a predetermined, specific photometric area (for example, a photometric area including a central region).

In the second embodiment, when exposure correction is effected, the exposure control values may be calculated taking into account the corrected exposure value.

The individual components shown in outline or designated by blocks in the drawings are all well-known in the image recording arts and their specific construction and operation are not critical to the operation or best mode for carrying out the invention.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image taking apparatus comprising:
   an image recording device that records an image of an object;
   a finder through which a user views said object, said finder having a field of view;
   a photometry device that divides an area in the field of view of said finder into a plurality of divided areas and detects a luminance of each of said plurality of divided areas;
   a detecting device that detects a specific one of the plurality of divided areas which includes a visual axis of a user; and
   a display device that respectively displays in each of the plurality of divided areas a difference between the luminance of each of said plurality of divided areas and the luminance of the specific one of the plurality of divided areas.

2. An image taking apparatus according to claim 1, wherein said display device changes a display format in accordance with an output from said detecting device.

3. An image taking apparatus according to claim 1, wherein said display device displays said specific one of the plurality of divided areas to which the visual axis corresponds differently than other ones of said plurality of divided areas to which the visual axis does not correspond.

4. An image taking apparatus according to claim 3, wherein said display device blinks on and off in said specific one of the plurality of divided areas to which the visual axis corresponds, and illuminates divided areas of the plurality of divided areas other than said specific one of the divided areas.

5. A method for displaying a luminance distribution of a photometric field using an image taking apparatus having a finder with a plurality of display sections corresponding to respective areas of the photometric field, said method comprising the steps of:
   determining a luminance value for each of the respective areas;
   designating one of the respective areas to be a reference area using a visual axis of a user of the image taking apparatus;
   computing a difference value for each of the respective areas other than the reference area, each difference value representing a difference between the luminance value for a respective area and the luminance value for the reference area; and
   displaying the difference value for each of the respective areas in corresponding display sections of the finder.

6. A camera comprising:
   an image recording device that records an image of an object;
   a finder through which the object is viewed, said finder having a field of view;
   a photometry device that divides an area of the field of view into a plurality of divided areas and detects a luminance of each of the plurality of divided areas;
   a detecting device that detects from among the plurality of divided areas a specific divided area which includes a visual axis of a user; and
   a display device that respectively displays in each of the divided areas other than the specific divided area a difference between the luminance of the divided area and the luminance of the specific divided area.

7. A camera according to claim 6, wherein said display device changes a display format in accordance with an output from said detecting device.

8. A camera according to claim 6, wherein said display device displays said specific divided area in a format different from that of other divided areas of the plurality of divided areas.

9. A camera according to claim 8, wherein said display means blinks on and off in said specific divided area, and illuminates divided areas other than said specific divided area.

10. An image taking apparatus comprising:

a photometry device that detects a luminance value for each of a plurality of areas of a photometric field;

a selection circuit that selects one of the plurality of areas to be a reference area;

a computing circuit that computes a difference value for each of the plurality of areas, each difference value representing a difference between the luminance value for a respective area and the luminance value for the reference area; and a display device that respectively displays the difference values for each of the plurality of areas.

11. A method for displaying a luminance distribution of a photometric field using an image taking apparatus having a finder with a plurality of display sections corresponding to respective areas of the photometric field, said method comprising the steps of:

determining a luminance value for each of the respective areas;

designating one of the respective areas to be a reference area;

computing a difference value for each of the respective areas, each difference value representing a difference between the luminance value for a respective area and the luminance value for the reference area; and displaying respective difference values for each of the respective areas in the corresponding plurality of display sections of the finder.

* * * * *

UNITED STATES PATENT AND TRADEMARK OFFICE
CERTIFICATE OF CORRECTION

PATENT NO. : 5,745,810
DATED : April 28, 1998
INVENTOR(S) : HIROSHI MATSUSHIMA

It is certified that error appears in the above-indentified patent and that said Letters Patent is hereby corrected as shown below:

<u>COLUMN 5</u>

```
Line 63, "-2degrees." should read -- -2 degrees.--
Line 67, "-2degrees" should read -- -2 degrees--.
```

Signed and Sealed this

Sixth Day of October, 1998

Attest:

BRUCE LEHMAN

*Attesting Officer*   Commissioner of Patents and Trademarks